United States Patent [19]

Murakami et al.

[11] Patent Number: 4,595,417
[45] Date of Patent: Jun. 17, 1986

[54] PROCESS FOR TREATING AQUEOUS SLURRY OF PIGMENT

[75] Inventors: Takeomi Murakami; Nobuo Ishikawa, both of Yokohama, Japan

[73] Assignees: Daikin Kogyo Co., Ltd., Osaka; Takeomi Murakami, Yokohama; Daido Kasei Kogyo Kabushiki Kaisha, Tokyo, all of Japan

[21] Appl. No.: 665,850

[22] Filed: Oct. 29, 1984

[30] Foreign Application Priority Data

Oct. 29, 1983 [JP] Japan ................................ 58-204547

[51] Int. Cl.$^4$ ......................... C04B 14/00; C09C 1/00
[52] U.S. Cl. ................................... 106/309; 106/262; 106/308 Q
[58] Field of Search ............... 106/309, 308 F, 308 Q, 106/264

[56] References Cited

U.S. PATENT DOCUMENTS

| 3,129,053 | 4/1964 | Castle ........................................ 8/611 |
| 3,509,061 | 4/1970 | Zisman et al. .................. 106/308 F |
| 3,974,089 | 8/1976 | Owen et al. ......................... 252/384 |

*Primary Examiner*—Theodore Morris
*Attorney, Agent, or Firm*—Armstrong, Nikaido, Marmelstein & Kubovcik

[57] ABSTRACT

A process for treating an aqueous slurry of pigment which comprises adding to the aqueous slurry a halogenated carbon medium which is in liquid state at room temperature and has at least one member selected from the group consisting of fluorine atom and chlorine atom in the molecule; agitating the aqueous slurry vigorously; separating the pigment in a form of cake containing the halogenated carbon medium; and drying the cake. According to the process of the present invention, a filtering step and a washing step can be eliminated and energy for drying can be greatly reduced. The pigment product obtained is excellent in brilliancy and clearness.

4 Claims, No Drawings

PROCESS FOR TREATING AQUEOUS SLURRY OF PIGMENT

BACKGROUND OF THE INVENTION

The present invention relates to a process for treating an aqueous slurry of pigment whereby the process and operation for manufacturing the pigment is simplified with industrial advantages imparted thereto.

Generally, a process for manufacturing a pigment comprises a chemical reaction step for preparing a pigment and precipitating the pigment in a medium, and a treatment step of the precipitated pigment including filtration, washing, drying, grinding and packing.

As the pigment there is mostly employed a pigment having a particle size of nearly 0.01 to 1 μm. In an organic pigment, a pigment having a particle size of about 0.2 μm is suitably employed for attaining a brilliant and clear color.

However, an aqueous slurry containing such fine pigment particles cannot be agitated with ease because the slurry is pasty and is mostly thixotropic. In addition, when the slurry is vigorously agitated, air foams formed in the slurry are hardly removed, and then the slurry becomes creamy.

In order to avoid the above industrial defects, production of a pigment is conducted in general by using a dilute aqueous slurry. For instance, the pigment slurry prepared by the reaction step has a pigment concentration of not more than 10% (% by weight, hereinafter the same), mostly 1 to 5%.

In the pigment product there remains a salt resulting from the mother liquor contained in the pigment cake which is separated from the aqueous slurry. In case of reducing the content of the salt, which is required in a pigment product for a printing ink, or the like, there is usually employed a process in which a pigment is prepared under the condition of a low concentration, and then the pigment prepared is washed with water by repeating dilution and decantation. The treatment in which filtration is carried out together with the repeated dilution and decantation is only employed in an unavoidable case where the washing efficiency of the pigment cake is remarkably low with any filter.

The water content of the filter cake thus obtained is 70 to 80% of that of a wet cake obtained by using a filter press, and is 80 to 90% of that of a wet cake obtained by using a rotary vacuum filter. It is very difficult to lower the water content further. Though use of a centrifugal filter can reduce the water content of a filter cake more than the use of the filter press, when the centrifugal filter is used for filtering a pigment slurry containing pigments of about 0.2 μm in particle size, there is a defect in that the filter was choked with the pigment particles to make the operation difficult.

In addition, there is an industrial disadvantage in that energy consumption required for drying the filter cake is large because it is necessary to evaporate water which weight is 3 to 5 times the weight of the solid content.

Furthermore, the pigment of such fine primary particles tends to form a hard mass. Particularly, a pigment containing a hydrophilic group has the greater tendency to do so. Grinding operation of the hard mass of the pigment is very troublesome, and additionally often has undesirable effects on the colour tone of the pigment product. The reason is assumed that the mechanical grinding cannot divide the secondary particles which are formed by agglomeration in the drying step from the original primary particles. As mentioned above, there are many problems in the conventional grinding and packing steps such as degradation in quality of the pigment product resulting from shape and size of such fine particles, and contamination of dirt occurred in handling.

An object of the present invention is to provide an industrially advantageous process for treating an aqueous slurry of pigment whereby the process for manufacturing the pigment is simplified and the above-mentioned problems are eliminated.

SUMMARY OF THE INVENTION

According to the present invention, there is provided a process for treating an aqueous slurry of pigment which comprises adding to the aqueous slurry a halogenated carbon medium which is in a liquid state at room temperature and has at least one member selected from the group consisting of fluorine atom and chlorine atom in its molecule; agitating the aqueous slurry vigorously; separating the pigment in the form of a cake containing the halogenated carbon medium; and drying the cake.

DETAILED DESCRIPTION

According to a preferred embodiment of the present invention, the halogenated carbon medium is added to the aqueous pigment slurry having a pigment concentration of 1 to 10%. The amount of the medium is preferably 3 to 10 time that of the solid content of the pigment. Vigorous agitation of the slurry causes exchange of water with the halogenated carbon medium, and then a precipitate of the pigment containing the halogenated carbon medium instead of water is formed at the bottom of the vessel in the form of fowl dropping, gum or paste. The clear water layer formed in the upper part can readily and fully be removed from the vessel, and then the remaining pigment cake containing the halogenated carbon medium (hereinafter referred to as "medium-containing pigment cake") is scraped. When the amount of the halogenated carbon medium is small the medium-containing pigment cake is in the form of fowl dropping, while when the amount of the medium is large the medium-containing pigment cake is pasty. A slight amount of water attached to the medium-containing pigment cake can be removed by allowing to stand or by pressing weakly with a water absorbable cloth which is tightly squeezed, and then a water free cake in the form of a rice cake of any shape is obtained.

In order to obtain the medium exchange effect in the aqueous pigment slurry, it is important to efficiently incorporate the small amount of the pigment particles dispersed widely in water into the water insoluble medium. For that purpose, vigorous agitation, e.g. about ten thousand r.p.m. in case of carrying out the operation in an about 1 l mixer, is required. In industrial scale a conventional large tank or mixer usually employed in a dye or pigment manufacturing factory is not suitable for use. The agitation is preferably carried out by employing a coned tank or a mixer of tens to hundreds of liters and moving blades at a linear velocity of about 3 to 20 m/sec, particularly about 5 to 13 m/sec at the top of the blade. There may be employed other mixing methods such as a mixing in a pump, e.g. turbine pump and a mixing by flowing turbulently the slurry through a pipe at a flow rate of not less than 3 m/sec. When the agitation is not enough, the resulting aqueous pigment slurry is merely in the form of rice gruel, and thus incomplete precipitation and separation of the medium-containing pigment cake are accomplished.

According to the process of the present invention, the time for separation of the medium-containing pigment cake from the slurry is extremely short, depending on the agitation velocity, e.g. about 10 to 30 seconds. Therefore, the process of the present invention can be carried out by employing a number of small tanks and charging or discharging intermittently, or by employing a continuous system.

Even if such a strong agitation is carried out for obtaining the medium exchange effect, the aqueous pigment slurry according to the present invention does not become an emulsion or a cream because of the use of the halogenated carbon medium which is liquid at normal temperature and has a high hydrophobic property. Typical examples of the halogenated carbon media are, for instance, trifluorotrichloroethane, tetrafluoroethylene, tetrachloromethane, tetrachloroethylene, and the like. The most preferable halogenated carbon medium is trifluorotrichloroethane.

Furthermore, the pigment prepared by using the halogenated carbon medium can attain a brilliant and clear color. For example, as a result of comparing the three pigments prepared by adding trifluorotrichloroethane, tetrachloroethylene and benzene to the aqueous slurries of pigment such as Carmine 6B, respectively, agitating the slurries to exchange the media, and then drying, the color of the pigment product prepared by using trifluorotrichloroethane was extremely excellent in brilliancy and clearness, and the color of the pigment product prepared by using tetrachloroethylene was also excellent in brilliant and clearness, but the color of the pigment product prepared by using benzene was remarkably dull.

As mentioned above, the use of the halogenated carbon medium can have a good influence on the separation procedure of the pigment cake and on the quality of the pigment product.

In addition, the halogenated carbon medium is excellent from the viewpoints of fire prevention and sanitation. Further heat energy requirement in the drying step of the medium-containing pigment cake can be greatly reduced because, for instance, the latent heat of evaporation of trifluorotrichloroethane (35 cal/g) is about 7% of that of water (540 cal/g). The halogenated carbon medium can be readily recovered in the drying step and can be reused.

According to the process of the present invention in which water in the aqueous pigment slurry is exchanged with the halogenated carbon medium, the following industrial advantages can be obtained. That is, (1) the filtering step and the washing step in the conventional process which have various problems associated therewith can be completely or almost eliminated, and (2) the heat energy consumption required for drying can be reduced to be several percents of that in the conventional process.

According to another preferred embodiment of the present invention, a fluorine-containing compound may be added, in a small amount, to the aqueous pigment slurry together with the halogenated carbon medium. The fluorine-containing compound is at least one member selected from the group consisting of trifluorochloroethylene polymer having a low polymerization degree, a fluorine-containing surfactant and a fine powder of tetrafluoroethylene polymer, and is difficult to be evaporated. Alternatively the fluorine-containing compound may be added, in a small amount, to the medium-containing pigment cake and kneaded with the cake.

The addition of the small amount of the fluorine-containing compound can prevent the pigment from agglomeration when the medium-containing pigment cake is dried by evaporating and recovering the halogenated carbon medium. Therefore the dried pigment cake thus obtained is so soft that one cannot pick it up with his fingers without breaking the cake and does not require pulverization.

Examples of the fluorine-containing surfactants are, for instance, a compound having a perfluoroalkyl group and a hydrophilic group such as a perfluoroalkylsulfonic acid salt, e.g. EFTOP 102 to 105 anion available from Shin Akita Kasei Kabushiki Kaisha, a perfluorocarboxylic acid salt, e.g. DS 101 to 102 anion available from Daikin Kogyo Co., Ltd., a perfluoroalkylamine compound, e.g. DS 201 to 202 cation available from Daikin Kogyo Co., Ltd., or an addition product of perfluoroalkylethylene oxide, e.g. DS 401 nonion, and the like. The average molecular weight of the trifluorochloroethylene polymer is preferably 500 to 1300. The amount of the fluorine-containing compound to be added is extremely small and is preferably about 0.01 to 1% of the solid content of the pigment.

According to the embodiment of the present invention in which the fluorine-containing compound is added, the following industrial advantages can be obtained in addition to the above-mentioned advantages (1) and (2). That is, (3) the pulverization step can be eliminated because the dried pigment cake is soft, particularly when the cake contains the fluorine-containing compound at about 1%, the dried cake is so soft that one cannot pick it up with his fingers without breaking the cake, and (4) the dry powder of the pigment obtained without pulverization cannot cause contamination in operations because the dry powder prepared according to the present invention is difficult to scatter in comparison to that prepared in the conventional process, and (5) the qualities of the pigment product such as brilliancy and clearness are superior to those of the conventional pigment product.

The present invention is more particularly described and explained by means of the following Examples. It is to be understood that the present invention is not limited to the Examples and various changes and modifications may be made in the invention without departing from the spirit and scope thereof.

EXAMPLE 1

A 1 l mixer (may be a mixer for home use) was charged with 1 l of a 1% aqueous slurry of Carmine 6B which was prepared by diazotizing p-toluidine-m-sulfonic acid, coupling the diazo salt with naphthoic acid and forming the lake pigment with rosin and calcium. To the slurry in the mixer, 50 g (5 times the weight of the pigment solid content) of trifluorotrichloroethane was added as the halogenated carbon medium. The mixture was stirred at 8,000 r.p.m. for 20 sec, and then at 1,000 r.p.m. for 20 sec to exchange the media. On completion of the media-exchanging, the aqueous slurry was separated into a clear supernatant layer of water and a medium-containing pigment cake precipitated to be an adzuki bean-like granular mass in the lower part of the mixer. The medium-containing pigment cake in a adzuki bean-like granular mass could be easily obtained without filtration by removing all water out of the vessel. There was nothing adhered to the inner walls of the vessel and the blades for stirring.

The medium-containing pigment cake was dried at 120° C. for 3 hrs and pulverized to give 10 g of the pigment product called Carmine 6B. In the drying step, about 99% of the liquid halogenated carbon medium used could be recovered.

EXAMPLE 2

The procedures in Example 1 were repeated except that Daifloil #3 (trifluorochloroethylene polymer having a low polymerization degree available from Daikin Kogyo Co., ltd., average molecular weight: 700, oily product) was previously added as the fluorine-containing compound into the halogenated carbon medium in an amount of 1% on the basis of the pigment solid content. The dried pigment cake thus obtained was so soft that one could not pick up with his fingers without breaking the cake.

The pigment product made of the dried cake without pulverization was superior to any pigment product prepared by the conventional process in brilliancy and clearness.

When the pigment product was kneaded with a vanish, the time required for the kneading was half of that in the blank test.

EXAMPLE 3

To the dried pigment cake prepared in Example 1 was added Daifloil #3 in an amount of 1% on the basis of the pigment solid content. The mixture was kneaded well and dried to give a pigment product having the same excellent properties as those in Example 2.

EXAMPLE 4

To a 3% aqueous slurry of diazo yellow prepared by tetrazotizing dichlorobenzidine and coupling the tetrazo salt with acetoacetanilide was added trifluorotrichloroethane (5 times the weight of the pigment solid content). The slurry was subjected to the medium exchange treatment in the same manner as that in Example 1 to give a granular medium-containing pigment cake.

Even without using any fluorine-containing compound, the dried pigment cake was so soft that the cake did not require further grinding as well as the pigment product prepared in Example 2 where the fluorine-containing compound was used.

Perhaps the reason is assumed that the pigment used in Example 4 has a much lower hydrophilic property in compared with the pigment used in Example 1.

EXAMPLE 5

The procedures in Example 2 where trifluorotrichloroethane and a small amount of trifluorochloroethylene polymer having a low polymerization degree were repeated except that a 3% aqueous slurry of phthalocyanine blue pigment was used instead of Carmine 6B. The dried pigment cake thus obtained was soft and could provide a more brilliant and clear pigment product of phthalocyanine blue.

The excellent properties of the pigment product prepared by using the fluorine-containing compound were apparently superior to a pigment product prepared by using no fluorine-containing compound.

EXAMPLE 6

The procedures in Example 2 were repeated except that a fluorine-containing anionic surfactant EFTOP 105 (lithium perfluoroalkylsulfonate available from Shin Akita Kasei Kabushiki Kaisha) was previously added as the fluorine-containing compound into the halogenated carbon medium in an amount of 1% on the basis of the pigment solid content. The dried pigment cake thus obtained was excellent in softness and could provide, without grinding, a brilliant and clear pigment product (Carmine 6B) in comparison with a pigment product (Carmine 6B) prepared by the conventional process.

EXAMPLE 7

The procedures in Example 2 were repeated except that a powder of tetrafluoroethylene polymer Lubron L-2 available from Daikin Kogyo Co., Ltd. instead of trifluorochloroethylene polymer having a low polymerization degree. The dried pigment cake thus obtained had similar excellent properties to those of the cake prepared in Example 2.

EXAMPLE 8

The procedures in Example 1 were repeated except that tetrachloromethane was used as the halogenated carbon medium instead of trifluorotrichloroethane. The dried and pulverized pigment product thus obtained had similar excellent properties to those of the pigment product prepared in Example 1.

In addition to the ingredients used in the Examples, other ingredients can be used in the Examples as set forth in the specification to obtain substantially the same results.

What we claim is:

1. A process for treating an aqueous slurry of pigment which comprises
   adding to the aqueous slurry a halogenated hydrocarbon medium which is liquid at room temperature and has at least one halogen selected from the group consisting of fluorine atom and chlorine atom in its molecule;
   agitating the aqueous slurry vigorously to cause the halogenated hydrocarbon medium to replace water as the medium wherein the pigment is dispersed;
   separating the pigment in the form of a cake containing the pigment and the halogenated hydrocarbon medium; and
   drying the cake to remove the halogenated hydrocarbon medium by evaporation.

2. The process of claim 1, wherein a small amount of at least one fluorine-containing compound selected from the group consisting of a trifluorochloroethylene polymer having a polymerization degree of 500–1300, a fluorine-containing surfactant and a fine powder of tetrafluoroethylene polymer is added to the aqueous slurry together with the halogenated carbon medium.

3. The process of claim 1, wherein a small amount of at least one fluorine-containing compound selected from the group consisting of a trifluorochloroethylene polymer having a polymerization degree of 500–1300, a fluorine-containing surfactant and a fine powder of tetrafluoroethylene polymer is added to the separated cake, and the cake is kneaded and dried.

4. The process of claim 1, wherein the halogenated hydrocarbon medium is selected from the group consisting of trifluorotrichloroethane, tetrafluoroethylene, tetrachloromethane and tetrachloroethylene.

* * * * *